US 7,849,174 B2

(12) United States Patent
Kawashima

(10) Patent No.: US 7,849,174 B2
(45) Date of Patent: Dec. 7, 2010

(54) NETWORK MANAGEMENT SYSTEM, DISPLAY METHOD, AND PROGRAM

(75) Inventor: Masanori Kawashima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1137 days.

(21) Appl. No.: 10/504,468

(22) PCT Filed: Feb. 27, 2003

(86) PCT No.: PCT/JP03/02193

§ 371 (c)(1),
(2), (4) Date: Aug. 12, 2004

(87) PCT Pub. No.: WO03/073297

PCT Pub. Date: Sep. 4, 2003

(65) Prior Publication Data
US 2005/0188067 A1    Aug. 25, 2005

(30) Foreign Application Priority Data
Feb. 28, 2002    (JP) .............................. 2002-054020

(51) Int. Cl.
G06F 15/173    (2006.01)
G06F 15/177    (2006.01)
G06F 3/00    (2006.01)
(52) U.S. Cl. ...................... 709/223; 715/736; 715/737; 715/738; 715/739
(58) Field of Classification Search ................. 709/223, 709/224; 715/736–739
See application file for complete search history.

(56) References Cited

U.S. PATENT DOCUMENTS

| | | | |
|---|---|---|---|
| 4,312,577 A | 1/1982 | Fitzgerald | ................... 353/12 |
| 5,353,399 A | 10/1994 | Kuwamoto et al. | ......... 395/159 |
| 5,777,895 A | 7/1998 | Kuroda et al. | ............... 364/550 |
| 5,910,803 A * | 6/1999 | Grau et al. | ................... 715/734 |
| 6,041,349 A | 3/2000 | Sugauchi et al. | ............ 709/223 |
| 6,181,341 B1 | 1/2001 | Shinagawa | ................. 345/356 |
| 6,308,205 B1 | 10/2001 | Carcerano et al. | |
| 6,721,818 B1 | 4/2004 | Nakamura | ..................... 710/9 |
| 6,868,525 B1 * | 3/2005 | Szabo | ........................ 715/738 |
| 6,970,923 B1 | 11/2005 | Mukaiyama et al. | |
| 2001/0017620 A1 | 8/2001 | Nara | .......................... 345/204 |

(Continued)

FOREIGN PATENT DOCUMENTS

EP    0 348 369 A2    12/1989

(Continued)

OTHER PUBLICATIONS

Official Letter/Search Report issued in Counterpart application No. 03804838.8.

(Continued)

Primary Examiner—Patrice L Winder
Assistant Examiner—Azizul Choudhury
(74) Attorney, Agent, or Firm—Fitzpatrick, Cella, Harper & Scinto

(57) ABSTRACT

It was difficult to examine in which location of which device installation map an icon of a desired network device has been arranged. A link to the device installation map is displayed in correspondence to the network device and the icon indicative of the designated network device is emphasis-displayed.

9 Claims, 13 Drawing Sheets

U.S. PATENT DOCUMENTS

| | | | |
|---|---|---|---|
| 2001/0049580 A1 | 12/2001 | Kusano et al. | 701/200 |
| 2002/0059211 A1* | 5/2002 | Kuramochi | 707/3 |
| 2002/0073356 A1 | 6/2002 | Katayama et al. | 714/4 |

FOREIGN PATENT DOCUMENTS

| | | |
|---|---|---|
| EP | 0 838 761 A | 4/1998 |
| EP | 0996253 A2 | 4/2000 |
| EP | 1056022 A2 | 11/2000 |
| JP | 9-237240 A | 9/1997 |
| JP | 10-177533 A | 6/1998 |
| JP | 10-187390 A | 7/1998 |
| JP | 11-27285 A | 1/1999 |
| JP | 2000-194626 | 7/2000 |
| JP | 2000-194626 A | 7/2000 |
| JP | 2000-200239 A | 7/2000 |
| JP | 2000-339251 A | 12/2000 |
| JP | 2000-347976 A | 12/2000 |
| JP | 2001-086774 | 3/2001 |
| JP | 2001-331393 A | 11/2001 |
| WO | WO 91/04553 A2 | 4/1991 |

OTHER PUBLICATIONS

Fukagawa, "Practical Home Page, Practical Use of Browser 11," Mainichi Communications, Nov. 24, 1999, vol. 4, No. 11, pp. 110-112 (in Japanese).

Fukagawa, "Practical Home Page, Practical Use of Browser 11," Mainichi Communications, Nov. 24, 1999, vol. 4, No. 11, pp. 110-112 (English translation).

Office Action from the Japan Patent Office dated Jun. 8, 2010, in connection with Japanese Patent Application No. 2007-263392, 2 pages (and English translation thereof, 2 pages).

* cited by examiner

FIG. 12

```
01: [DeviceMap]
02: Count=2
03:
04: [Map0]
05: ID=1
06: Name=1st Floor
07:
08: [Map1]
09: ID=2
10: Name=2nd Floor
```

FIG. 13

```
01: <MAPDATA WIDTH="720" HEIGHT="480">
02:   <BACKGROUND SRC="map1.png" />
03:   <MAP NAME="Office 2F" ID="2" ICON="map_08"
04:     XPOSITION="38" YPOSITION="21" />
05:   <WEB NAME="CA INC." URL="www.ca.com/" ICON="map_13"
06:     XPOSITION="441" YPOSITION="19" />
07:   <WEB NAME="Notice Board" URL="www.ca.com/" ICON="map_11"
08:     XPOSITION="77" YPOSITION="98" />
09:   <DEVICE TYPE="mfp" NAME="CP200"
10:     MODEL="CP200" NIC="Network Multi-PDL Printer Board-D1"
11:     NETADDER="10.168.16.xx" MACADDR="00C0852578D9"
12:     XPOSITION="305" YPOSITION="26" />
13:   <DEVICE TYPE="lbpdef" NAME="P-2360"
14:     MODEL="P-2360" NIC="NB-E1"
15:     NETADDER="10.168.16.xx" MACADDR="0000851121FA"
16:     XPOSITION="288" YPOSITION="272" />
17: </MAPDATA>
```

FIG. 14

```
01: <MAPDATA WIDTH="720" HEIGHT="480">
02: <BACKGROUND SRC="map2.png" />
03: <MAP NAME="1st Floor" ID="1" ICON="map_09"
04:     XPOSITION="35" YPOSITION="21" />
05: <WEB NAME="CA INC." URL="www.ca.com/" ICON="map_13"
06:     XPOSITION="632" YPOSITION="191" />
07: <WEB NAME="Related Pages" URL="www.ca.com/" ICON="map_10"
08:     XPOSITION="234" YPOSITION="23" />
09: <DEVICE TYPE="clbp" NAME="P460PS"
10:     MODEL="P460PS" NIC="P460PS Network module"
11:     NETADDER="10.168.16.xx" MACADDR="00C08529E62C"
12:     XPOSITION="180" YPOSITION="447" />
13: <DEVICE TYPE="lbpdef" NAME="P-930EX"
14:     MODEL="P-930EX" NIC="NB-2"
15:     NETADDER="C0A81000.000085044810" MACADDR="000085044810"
16:     XPOSITION="356" YPOSITION="447" />
17: </MAPDATA>
```

FIG. 15

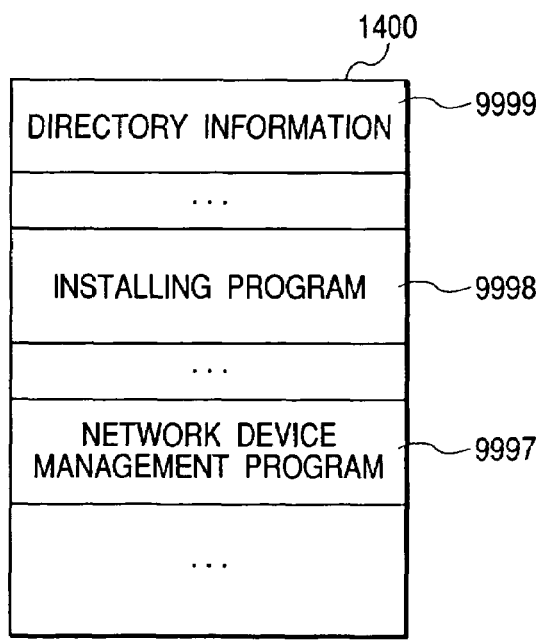

NETWORK MANAGEMENT SYSTEM, DISPLAY METHOD, AND PROGRAM

TECHNICAL FIELD

The invention relates to a computer network and, more particularly, to a network device management system according to network device management software for managing a network device connected to a computer network.

BACKGROUND ART

TCP/IP Protocol is a protocol for managing a network such as an SNMP (Simple Network Management Protocol). At present, TCP/IP Protocol is not limited for TCP/IP based networks but is also widely used as a network management protocol of a network based on a protocol other than the TCP/IP.

Usually, in the network management based on the SNMP, an MIB (Management Information Base) which a network device (agent) as a management target has is accessed by using the SNMP protocol from a PC (manager) for managing the network device, thereby making management. The MIB has a data structure like a tree and identifiers such as object IDs which can be unconditionally identified have been allocated to all nodes. Such a structure of the MIB is called SMI (Structure for Management Information) and has been specified in RFC1155, "Structure and Identification of Management Information for TCP/IP-based Internets".

As a method for efficiently finding various resources (printer, copying apparatus, server, scanner, etc.) on the network and using them, a method called a directory service has been provided. The directory service is, as it were, a directory (telephone book) regarding the network and used to store various information. As specific examples of the directory service, there are an LDAP (Lightweight Directory Access Protocol) specified in RFC1777 and an NDS (Netware Directory Service) of Novell Co., Ltd. In the case of an environment in which the directory service cannot be used, the network device can be searched by using SNMP broadcast.

In a conventional network device management system, for example, the network device connected to the network can be searched by using the SNMP/MIB or the directory service and a state of the network device and various information set in the network device can be displayed and changed.

In recent years, a Web application has vigorously been developed so that the following effects are obtained: the user can access network management information unitarily managed on a server PC (server computer) from a plurality of client PCs (client computers) via a Web browser, browse a list of the network devices connected to the network, browse and change the states of the network devices and various information set therein, and the like. In this instance, the Web server and the Web browser communicate by an HTTP (Hyper Text Transfer Protocol).

As one of functions of such a Web application, there is a function of arranging and displaying icons (device icons) indicative of the network devices as management targets onto a virtual map so that actual installing locations of the network devices can be recognized. In the specification, such a function or the map formed by the function is called a "device map". Such a function is effective at the time of confirming the installing locations of the network devices in case of occurrence of an error (for example, paper jam or absence of paper) such that the user or an administrator of the network has to go to the installing location of the failed network device as a management target and take some measures, or the like.

DISCLOSURE OF INVENTION

In the above conventional example, however, since the list of the network devices and one or a plurality of device maps formed every installing location have independently been displayed, in the cases where there are a plurality of device maps, a number of devices are arranged on the device map, or the like, it is difficult to examine in which location of which device map the desired network device has been arranged.

To solve the above problem, therefore, the invention is characterized in that in which location of which device map identification information of a designated network device has been arranged is displayed to the user so that he can easily and quickly grasp it.

BRIEF DESCRIPTION OF THE DRAWINGS

FIG. 12 is a diagram showing an example of device map management information;

FIG. 13 is a diagram showing an example of device map construction information;

FIG. 14 is a diagram showing an example of device map construction information; and FIG. 15 is a diagram showing a memory map of a memory medium.

BEST MODE FOR CARRYING OUT THE INVENTION

The operations of network device management software according to the invention and a network device management system based on the network device management software will be described hereinbelow with reference to the drawings.

Figure 1:
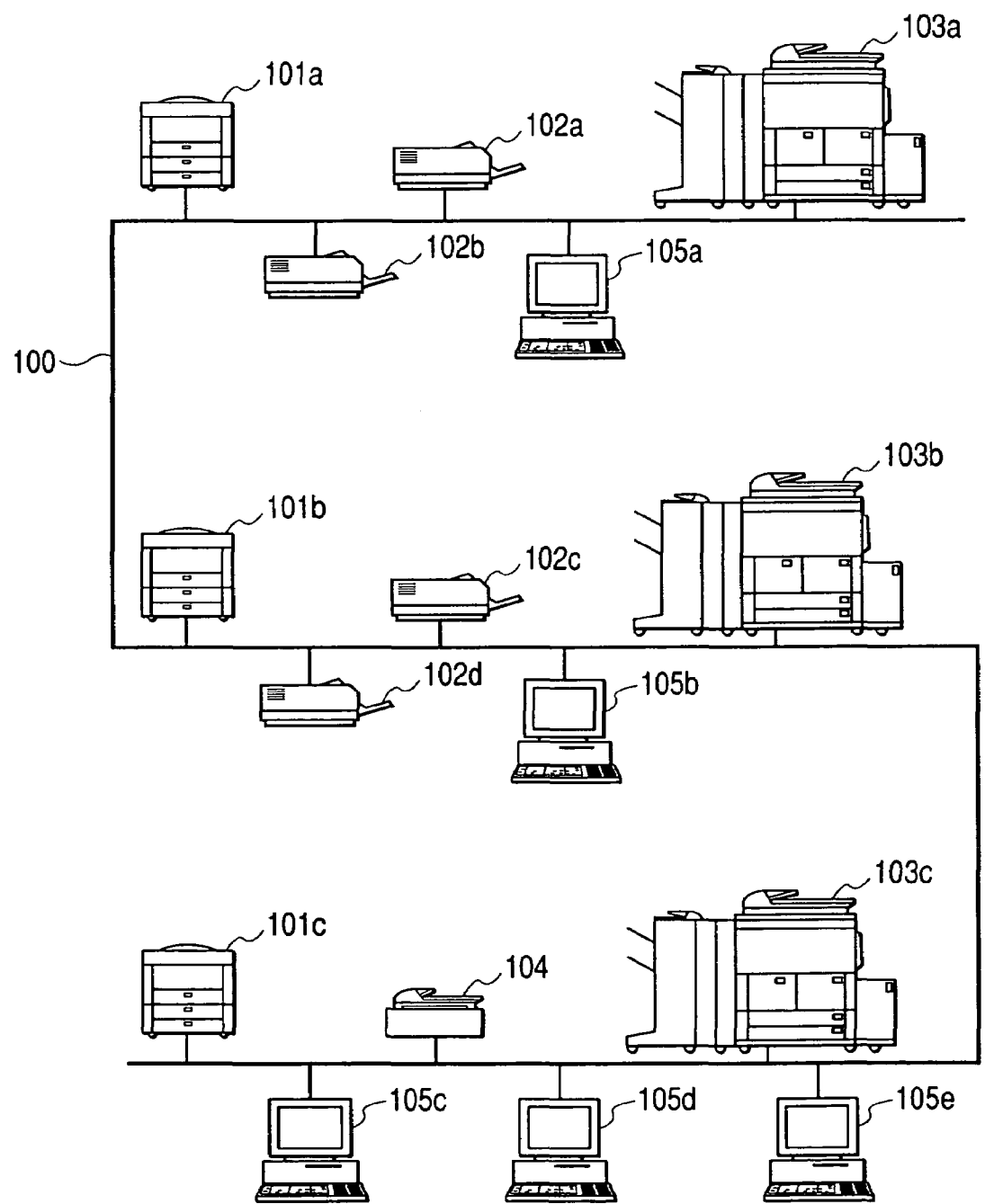
FIG. 1 is a diagram showing a construction of a network on which a network device management system can operate.

FIG. 1 is a diagram showing a construction of a network on which the network device management system according to the invention can operate. In FIG. 1, all network devices as management targets, a server PC (server computer) for network management, and client PC (client computers) for network management are connected to a LAN 100.

Reference numerals 101a to 101c denote color printers; 102a to 102d monochromatic printers; 103a to 103c hybrid apparatuses (devices having a copying function, a facsimile function, and a printer function); and 104 a scanner. Those apparatuses are equipped with network interface cards or the like, so that they are connected to the LAN 100, respectively. The network devices are not limited to them but other apparatuses which can be connected to the network can be used.

Those network devices are network devices which can be managed by the network device management system. They can be searched by a method such as a directory service or the like and information can be obtained and set by the SNMP/MIB.

Reference numerals 105a to 105e denote PCs (Personal Computers) which can be connected to the network. Those PCs are PCs on which the network device management software according to the invention can operate. In the case where the network device management system according to the invention has been constructed by the Web server and the Web browser, the network device management software and the Web server operate on one of the server PCs and the Web browser operates on other PCs (client PCs). The Web browser accesses the network device management software which is operating on the server PC, thereby enabling the user to use the network device management system.

Figure 2:
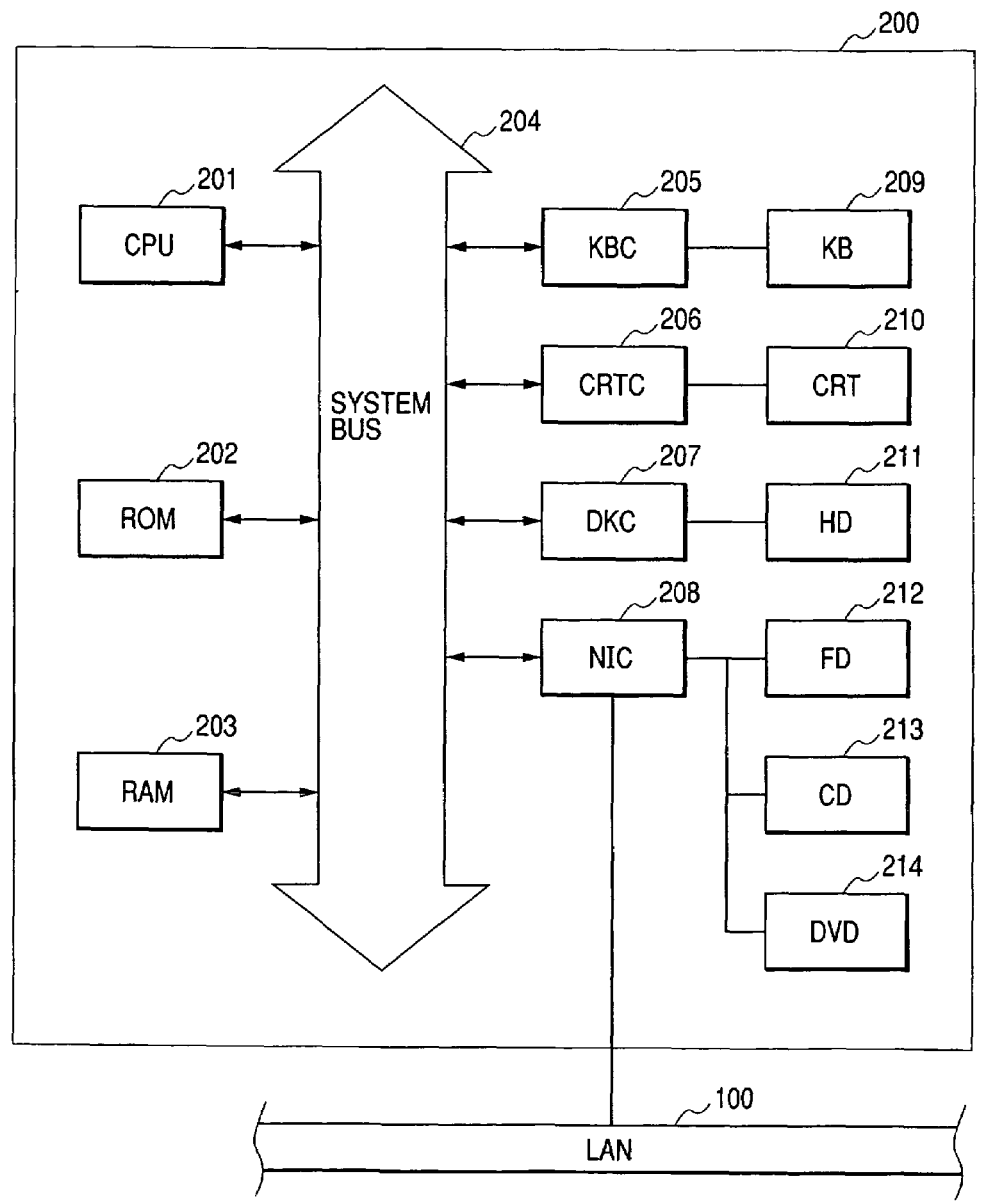
FIG. 2 is a block diagram showing an example of a construction of a PC on which network device management, software can operate.

FIG. 2 is a block diagram showing an example of a construction of a PC on which network device management software according to the invention can operate. In FIG. 2, reference numeral 200 denotes a PC on which the network device management software operates and it is similar to the PCs 105a to 105e in FIG. 1. The PC 200 has a CPU 201 for executing the network device management software which has been stored in a ROM 202 or an HD (hard disk) 211 or which is supplied from an FD (floppy disk drive) 212, a CD (CD-ROM drive) 213 or a DVD (DVD-ROM drive) 214. The PC 200 integratedly controls devices which are connected to a system bus 204.

Reference numeral 203 denotes a RAM which functions as a main memory, a work area, or the like of the CPU 201; 205 a KBC (keyboard controller) for controlling an instruction input from a KB (keyboard) 209, a pointing device (not shown), or the like; 206 a CRTC (CRT controller) for controlling a display of a CRT (CRT display) 210; and 207 a DKC (disk controller) for controlling accesses to the HD 211, FD 212, CD 213, and DVD 214 for storing a boot program, various applications, an edition file, a user file, the network device management software, and the like.

Reference numeral 208 denotes an NIC (network interface card) for bidirectionally transmitting and receiving data to/from other network device via the LAN 100.

In all descriptions which will be made hereinbelow, a substance of execution on hardware is the CPU 201 and a substance of control on software is the network device management software installed onto the HD (hard disk) 211, unless otherwise specified.

Examples of various display screens which are displayed by the network device management system according to the invention will be described hereinbelow.

Figure 3:
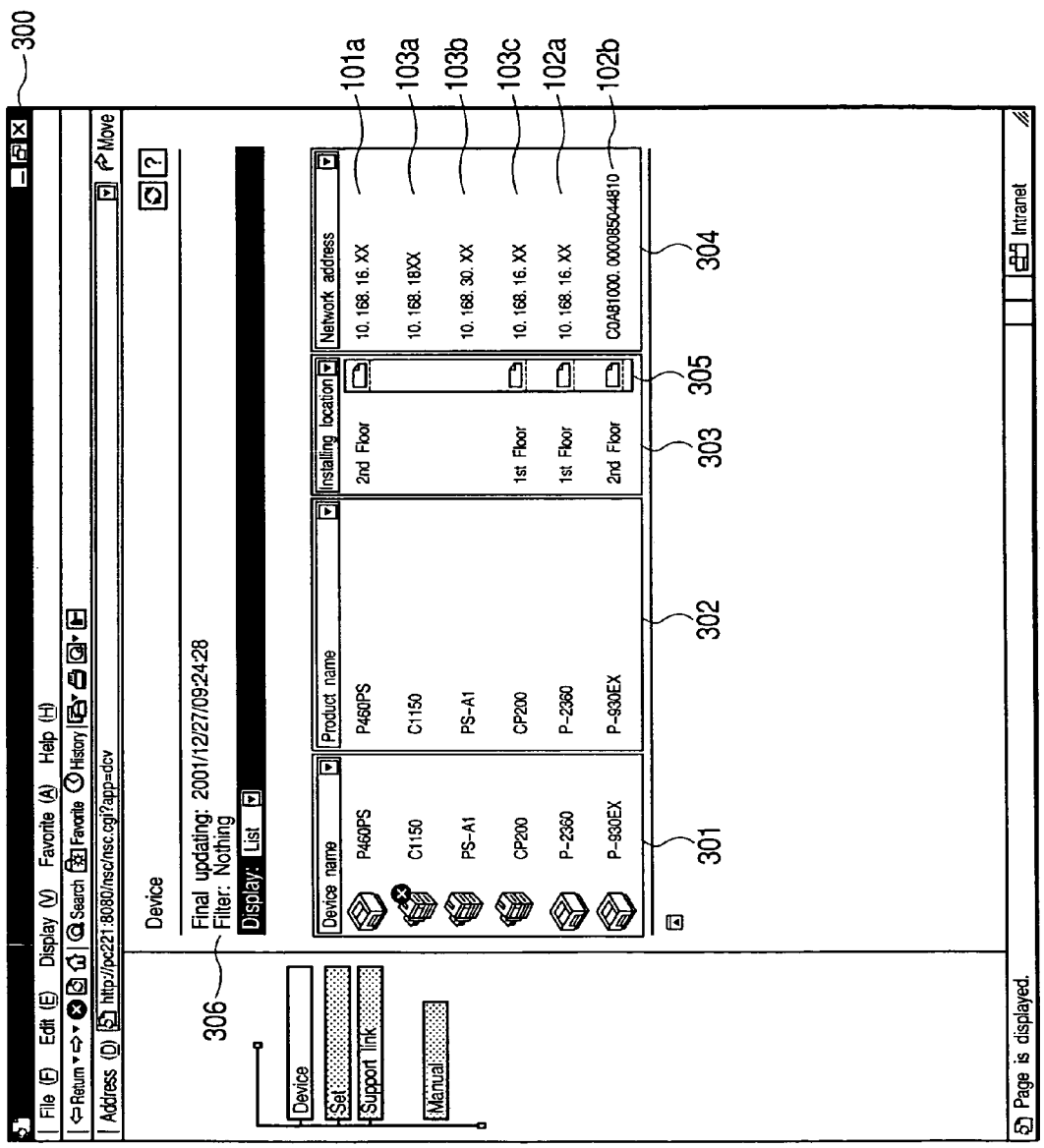
FIG. 3 is a diagram showing an example of a device list (list of devices) which is displayed by the network device management system.

FIG. 3 shows an example of a device list (list of devices) which is displayed by the network device management system according to the invention. As shown in the diagram, in this example, among the network devices connected to the LAN 100, the color printer 101a, the printers 102a and 102b, and the hybrid apparatuses 103a to 103c are displayed on a device list 300.

In the device list, (1) the network devices searched by a searching procedure using the MIB/SNMP according to the network device management system, (2) the partial network devices selected from the searched network devices, (3) the network devices manually registered into the network device management system, and the like are displayed in a list format.

In the diagram, reference numeral 306 denotes a dropdown list box for switching a display format. Since "list" is selected at present, the network devices are displayed in a list format. By selecting "map format" in the dropdown list box 306, a device map 500 or 600, which will be explained hereinlater, can be displayed.

As information of each network device, a device name 301, a product name 302, an installing location 303, and a network address 304 are displayed on the device list 300.

Further, a link 305 (to a device map) to display the device map on which icons indicative of the corresponding network devices have been arranged is displayed in an area of the installing location 303. In this example, the link 305 to display device maps of arranging destinations is displayed for the color printer 101a, the hybrid apparatus 103c, and the printers 102a and 102b. This link is a button for displaying the devices.

In FIG. 3, specifically, information corresponding to 101a, 103a, 103b, 103c, 102a, and 102b in FIG. 1 is displayed in each line.

When the user clicks the link 305, the device map corresponding to the link is displayed. For example, in the device list 300, when the link 305 to the device map displayed in the area of the installing location 303 of the printer 102a is clicked, a device map 700 shown in FIG. 7, which will be explained hereinlater, is displayed.

Figure 4:
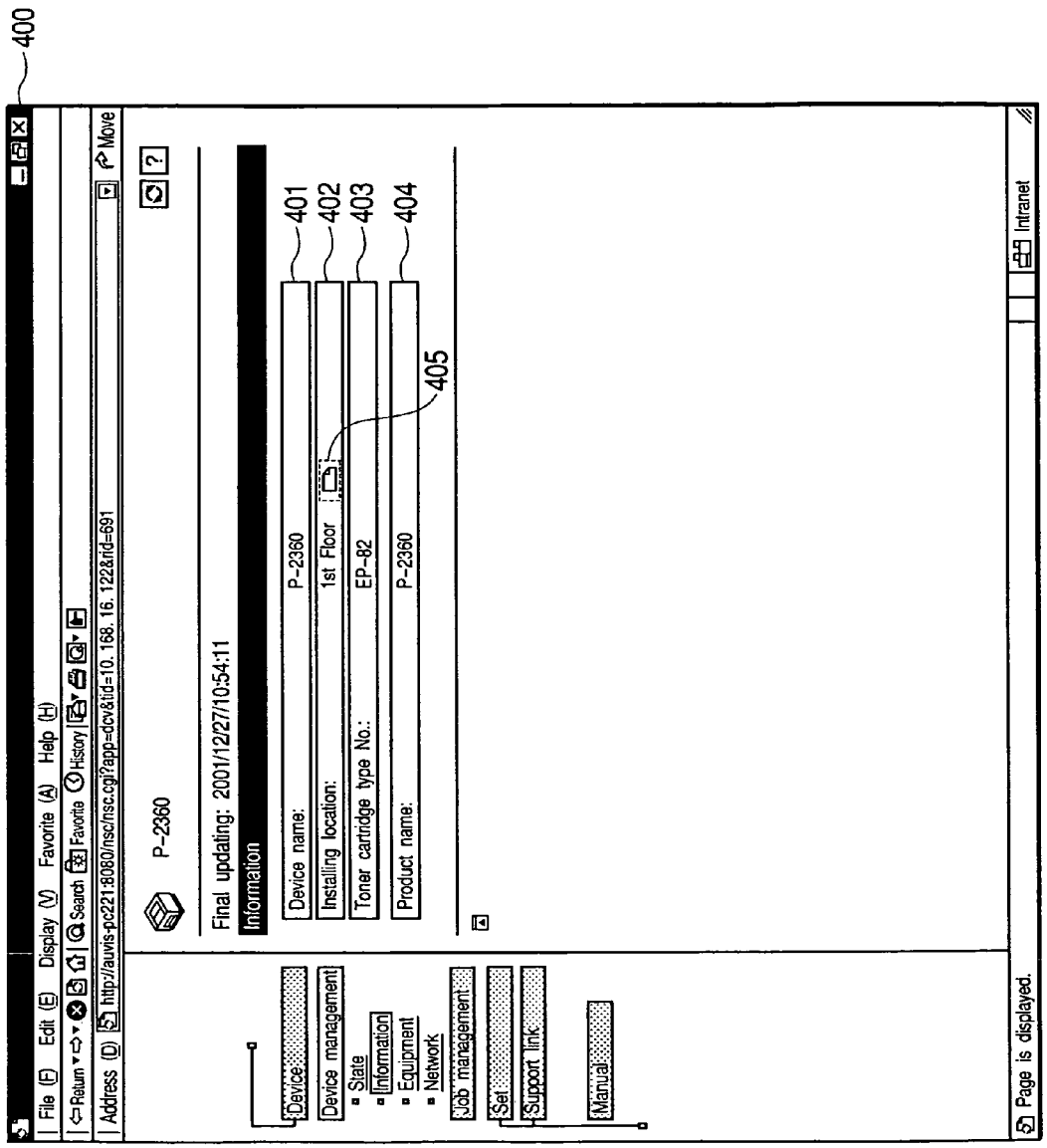
FIG. 4 shows an example of a device management page.

FIG. 4 shows an example of a display screen which is displayed when a specific one of the network devices displayed in the device list 300 in FIG. 3 is selected. FIG. 4 shows an example of a device management page which is displayed when the printer 102a is designated.

Although the page in which the information for identifying mainly the network devices has been displayed is shown in this example, it can be switched to another page (not shown) in order to display other information (error state, equipment information, network information, job information, etc.).

In FIG. 4, a device name 401, an installing location 402, a toner cartridge type number 403, a product name 404, and the like are displayed as information regarding the printer 102a in a device management page 400. Further, a link 405 to a device map on which the icon indicative of the printer 102a has been arranged is displayed in an area of the installing location 402. When the user clicks the link 405 to the device map, the device map 700 shown in FIG. 7, which will be explained hereinlater, is displayed.

This link is displayed only when the icons have been arranged on the device map, thereby making it possible to prevent a situation such that the user unnecessarily displays, the device map in spite of the absence of the corresponding device map.

Figure 5:
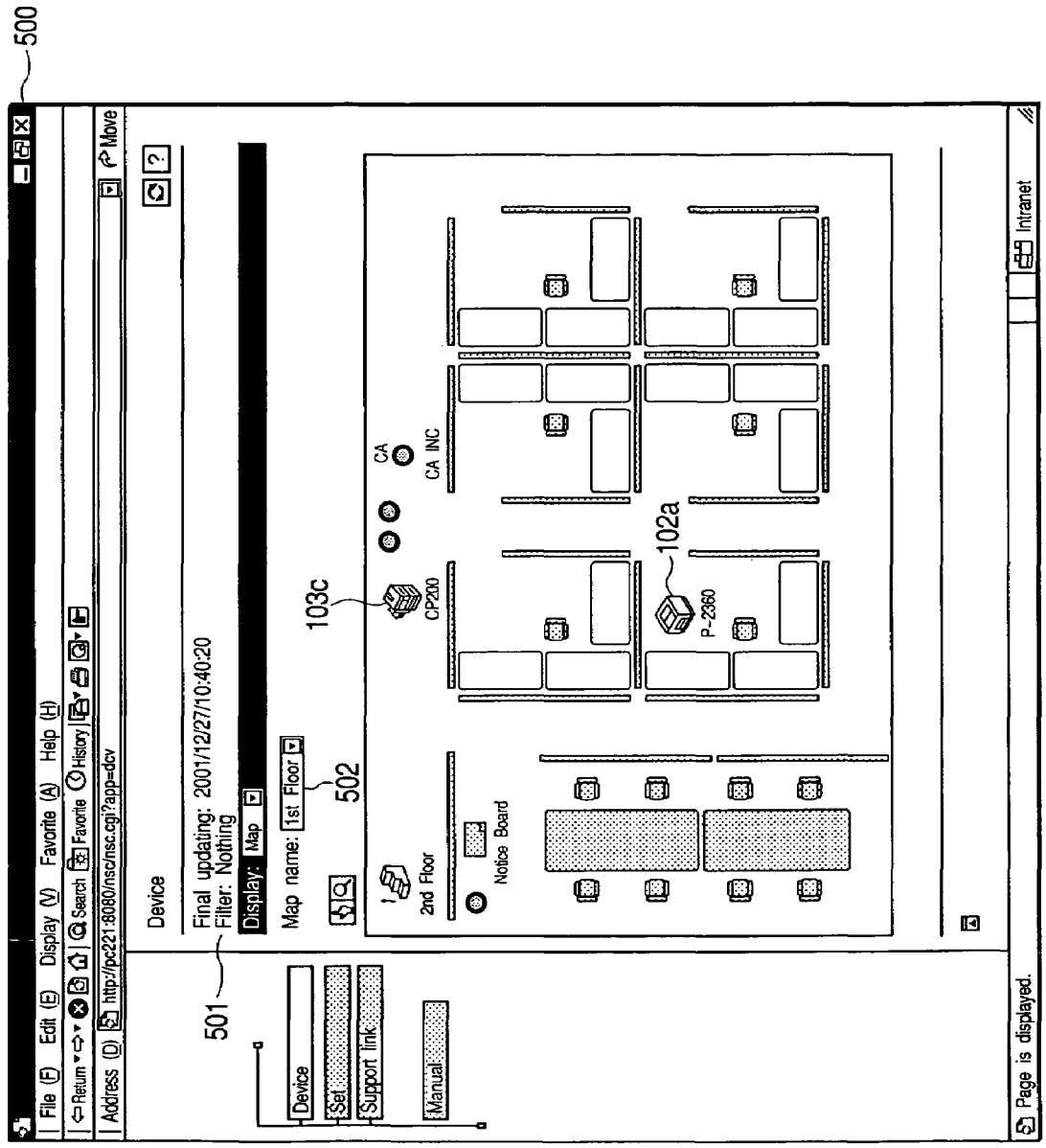
FIG. 5 shows an example of a device map which is displayed by the network device management system.
Figure 6:
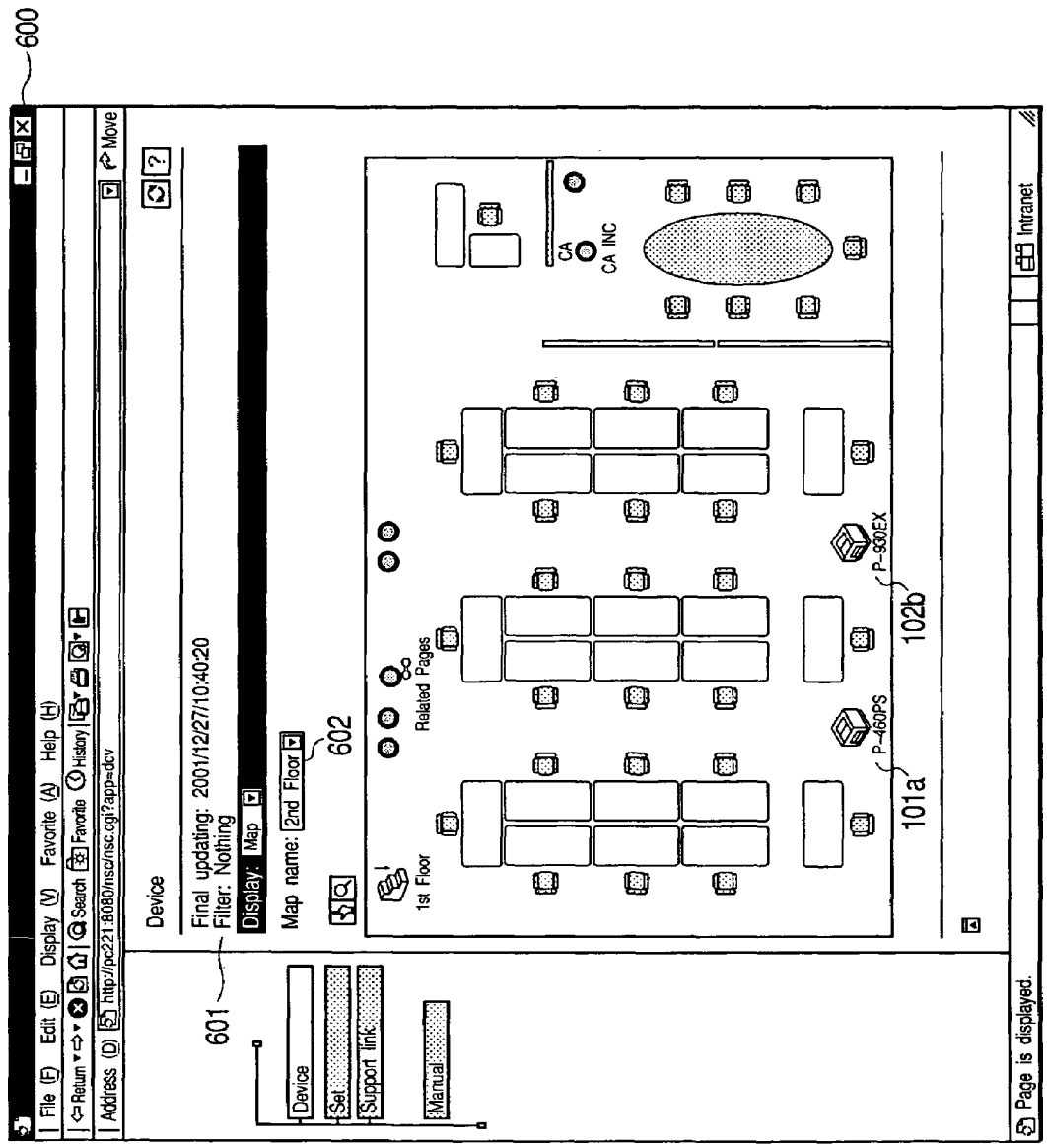
FIG. 6 shows an example of a device map which is displayed by the network device management system.

FIGS. 5 and 6 show examples of device maps which are displayed by the network device management system according to the invention. The icon indicative of the printer 102a, the icon indicative of the hybrid apparatus 103c, and icons for moving to another device map among the network devices connected to the LAN 100 in FIG. 1 have been arranged in FIG. 5.

The icon indicative of the color printer 101a, the icon indicative of the printer 102b, and icons for moving to another device map among the network devices connected to the LAN 100 in FIG. 1 have been arranged in FIG. 6.

In the diagrams, reference numerals 501 and 601 denote dropdown list boxes for switching the display format to display the network devices. By selecting "list format" in the dropdown list box 501 or 601, the device list 300 can be displayed.

Further, reference numerals 502 and 602 denote dropdown list boxes for selecting the device map to be displayed. When "1st Floor" is selected, the device map corresponding to the first floor is displayed. In this instance, the device maps 500 and 600 can be switched in the dropdown list boxes.

Figure 7:
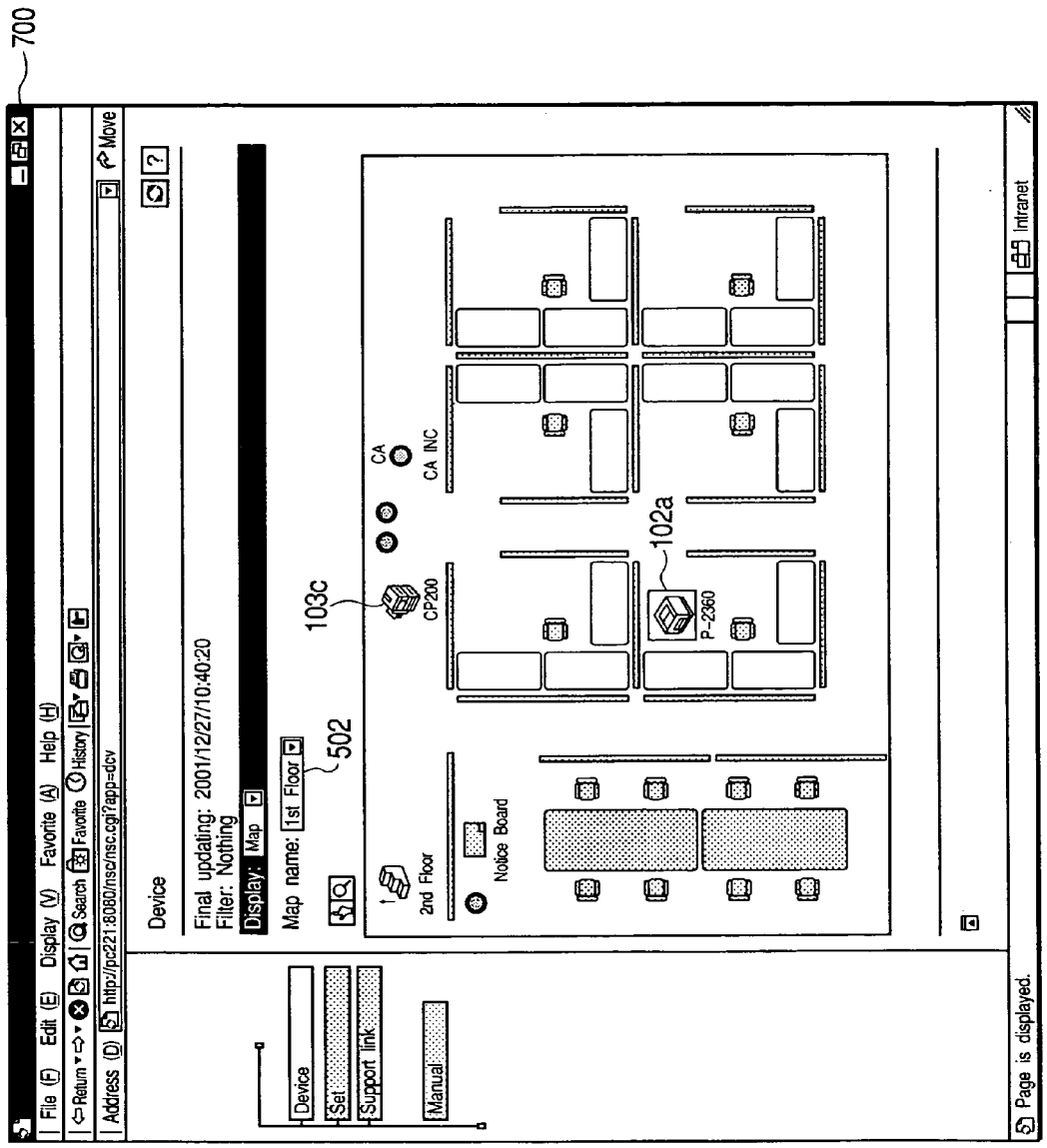
FIG. 7 shows an example of a device map which is displayed by the network device management system.

FIG. 7 shows an example of a device map which is displayed by the network device management system according to the invention. FIG. 7 differs from FIG. 5 with respect to a point that the icon of the printer 102b is surrounded by a quadrangle and emphasis-displayed. That, is, FIG. 7 shows the example of the device map which is displayed in the case where the link to the device map associated with each device is clicked.

The device map 700 in FIG. 7 is displayed in the case where, in the device map 300 shown in FIG. 3, the link 305 to the device map displayed in the device information display area of the printer 102a is clicked or in the case where the link 405 to the device map displayed on the device management page 400 of the printer 102a shown in FIG. 4 is clicked.

Although the emphasis display is made by surrounding the icon by the quadrangle, it can be made in another form such that the color of the icon is changed, the icon flickers, or the icon is enlarged.

In the invention, the process for displaying the links 305 and 405 to the device map to the device list 300 shown in FIG. 3 and the device management page 400 shown in FIG. 4, respectively, and the emphasis displaying process of the device icon (icon indicative of the network device) in the device map 700 shown in FIG. 7 will be explained hereinlater with reference to flowcharts.

Figure 8:
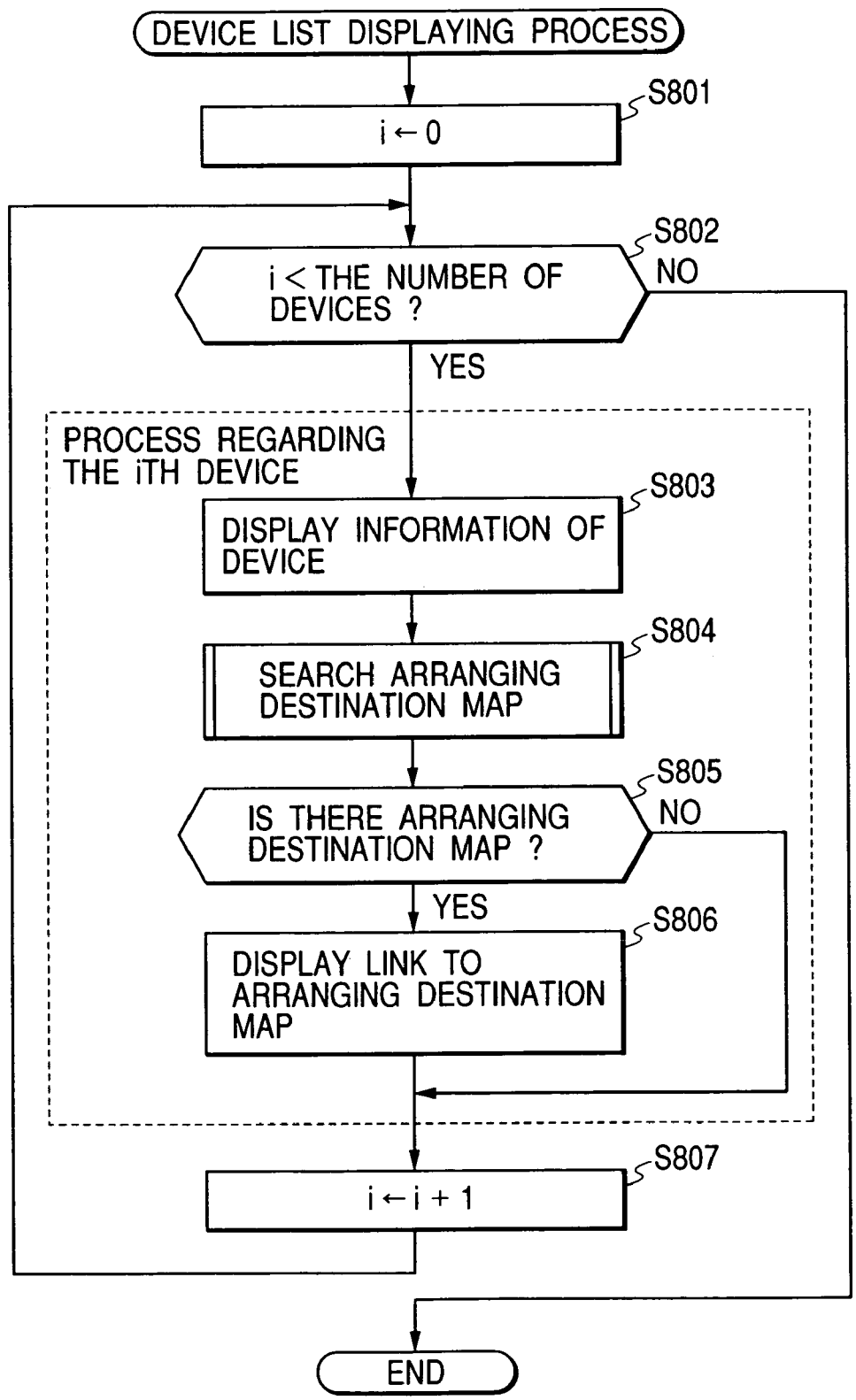
FIG. 8 is a flowchart showing an example of a process in the case of displaying a link 305 to the device map.

FIG. 8 is a flowchart showing an example of the process in the case where the link 305 to the device map is displayed to the device list 300 shown in FIG. 3.

In the flowchart, in step S801, a value of a variable i to count the number of devices which are displayed in the device list is initialized to 0. Step S802 follows. The value of the variable i becomes an index value which starts from 0 and is used to refer to each network device in the following processes.

In step S802, the value of the variable i is compared with the number of devices which are displayed in the device list. If the value of the variable i is smaller than the number of devices, step S803 follows (YES in step S802). Otherwise, the processing routine is finished (NO in step S802).

In step S803, information regarding the network device (the ith network device) in which the value of the variable i is used as an index is displayed in a display area of the device information. Step S804 follows. The device information which is displayed here is information obtained from the network device when the network device as a management target is searched (for example, a device name, a product name, an installing location, a network address, an MAC address, etc.) and information held in the network device management system with respect to the network device as a management target (for example, a print speed, print resolution, etc.). The information which is displayed can be changed every user.

In step S804, the device map on which the network device using the value of the variable i as an index has been arranged is searched in accordance with a procedure shown in FIG. 10, which will be explained hereinlater. In step S804, it is assumed that if the device map on which the icon showing the network device has been arranged is searched, the information (for example, the ID of the device map) to identify the device map on the arranging destination side is returned.

In step S805, whether the device map on which the icon showing the network device has been arranged has been detected in step S804 or not is discriminated. If the device map has been detected, step S806 follows (YES in step S805). Otherwise, step S807 follows (NO in step S805). Whether the device map has been detected or not can be confirmed by checking whether the ID information to identify the device map has been returned or not.

In step S806, on the basis of the ID information to identify the device map obtained in the process in step S804, the link to display the device map shown by the ID information is displayed in the display area of the device information.

In step S807, 1 is added to the value of the variable i and step S802 follows.

By this process, the information regarding the network device is displayed to each network device. If the icon showing the network device has been arranged on one of the device maps, the link to this device map can be displayed.

Figure 9:
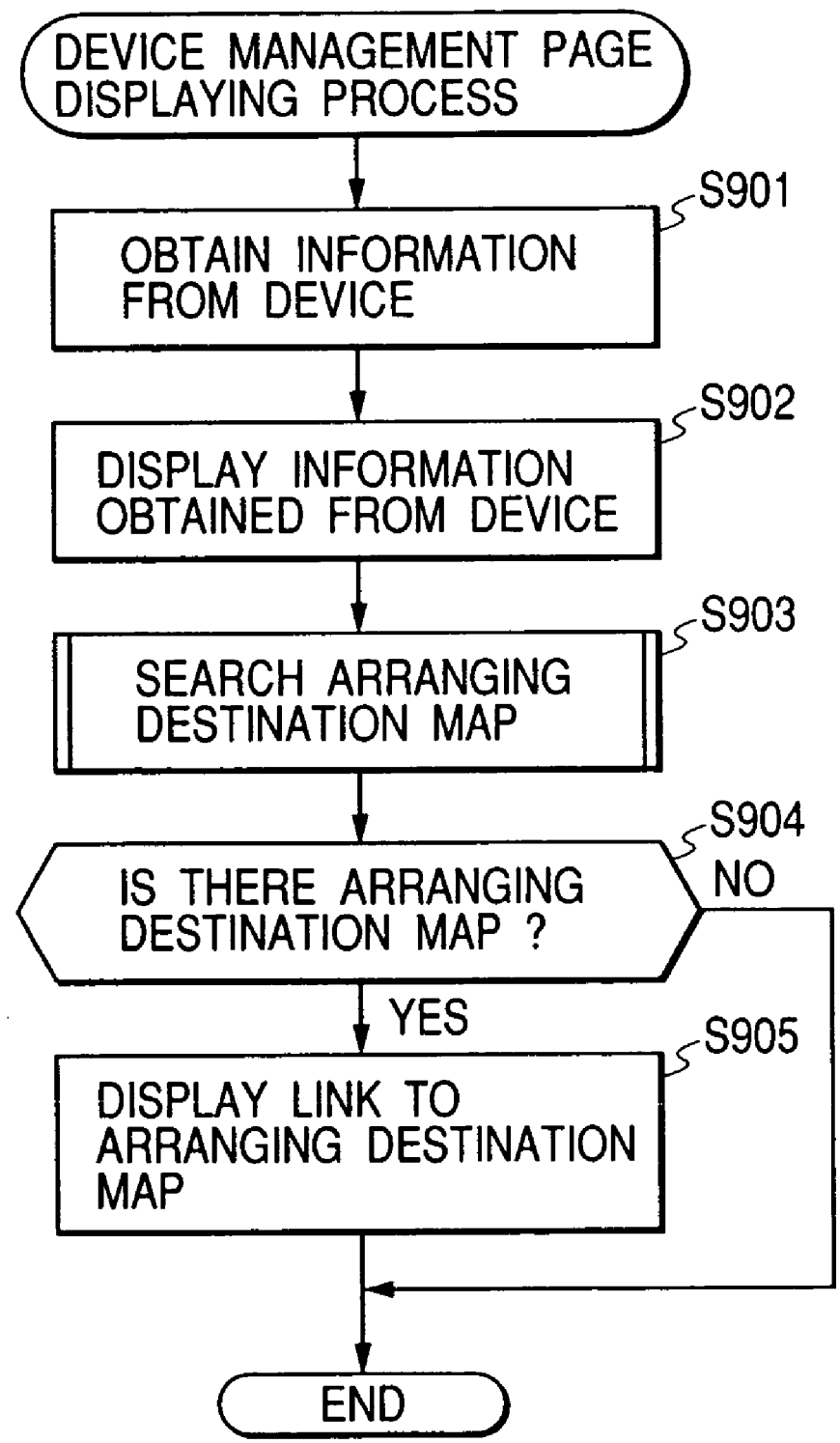
FIG. 9 is a flowchart showing an example of a process in the case of displaying a link 405 to the device map.

FIG. 9 is a flowchart showing an example of a process in the case where the link 405 to the device map is displayed to the device management page 400 shown in FIG. 4.

In the flowchart, in step S901, information which is displayed to the device management page 400 is obtained by using the MIB/SNMP from the network device serving as a management target of the device management page, that is, from the network device selected from the device list. In the example of FIG. 3, the device name 401, installing location 402, toner cartridge type number 403, product name 404, and the like are obtained from the network device.

In step S902, the information obtained from the device in step S901 is displayed. In step S903, the device map on which the icon showing the network device serving as a management target of the device management page has been arranged is searched in accordance with the procedure shown in FIG. 10, which will be explained hereinlater. In this process, it is assumed that if the device map on which the device icon has been arranged has been detected, the information (for example, ID of the device map) to identify the detected device map is returned.

In step S904, whether the device map on which the device icon of the device serving as a management target of the device management page has been arranged has been detected in step S903 or not is discriminated. If the device map has been detected, step S905 follows (YES in step S904). Otherwise, the processing routine is finished (NO in step S904).

In step S905, on the basis of the information to identify the device map obtained in the process in step S903, the link to display the detected device map is displayed in the display area of the device information. In the example of the device management page 400 shown in FIG. 4, the link 405 to the device map is displayed in the area for displaying "installing location" in the display area of the device information.

FIGS. 8 and 9 show a displaying process of the network device management software in the case where the network device management software is activated in each PC.

However, in the case where the network device management software and the Web server are activated by the server PC and the Web browser activated in each client PC accesses the network device management software, the "displaying process" in FIG. 8 denotes the process such that the network device management software on the server PC embeds the information to be displayed on the Web page which is provided to the Web browser via the Web server. That is, if the Web page is described by a language such as HTML (Hyper Text Markup Language), XML (extensible Markup Language), or the like, the information regarding the network device or the link to the device map is described on the Web page. The network device management software transmits the data of the formed Web page to the Web browser via the Web server.

Figure 10:
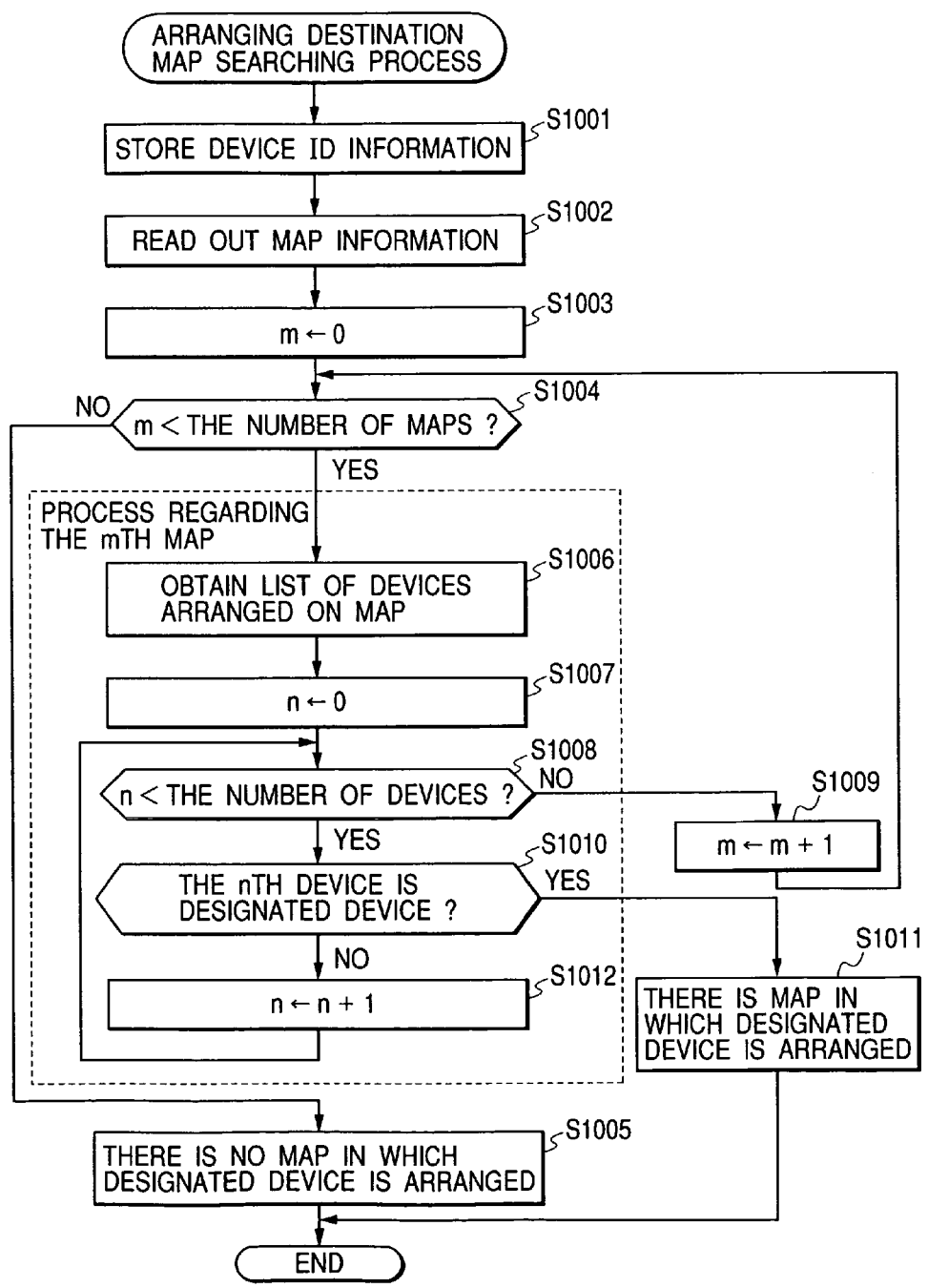
FIG. 10 is a flowchart showing an example of a process for searching a device map on which device icons have been arranged.

FIG. 10 is a flowchart showing an example of a process for searching the device map on which the device icons have been arranged, and this process is executed in step S804 in FIG. 8 and in step S903 in FIG. 9.

In FIG. 10, in step S1001, the ID information to identify the network device which is designated when this process is activated and serves as a processing target of the process is stored. As ID information to identify the network device, for example, the MAC address or the like is generally used. However, another ID information can be used.

In step S1002, information (device map management information) to manage the device map formed in the edition page of the device map is read out. FIG. 12 shows an example of the device map management information which is read out here. In the diagram, reference numeral shown at the left edge of each line indicates a line number added for the purpose of simply explaining. In the diagram, the number of device maps has been stored on line 2, an ID and a name of the first device map have been stored on lines 4-6, and an ID and a name of the second device map have been stored on lines 8-10, respectively.

In the example, it will be understood that there are two device maps, the ID of the first device map is equal to 1, its name is "1st Floor", the ID of the second device map is equal to 2, and its name is "2nd Floor". The ID of the device map is used to access construction information (device map construction information) of each device map, which will be explained hereinlater, and identify the device map which is displayed when the link to the device map is clicked.

In step S1003, a value of a variable m to count the number of device maps is initialized to 0. The value of the variable m becomes an index value which starts from 0 and is used to refer to each device map in the following processes.

In step S1004, the value of the variable m is compared with the number of device maps. If the value of the variable m is smaller than the number of device maps, step S1006 follows (YES in step S1004). Otherwise, step S1005 follows (NO in step S1004).

In step S1005, a message showing that the device map on which the device icon of the designated network device has been arranged does not exist is returned as a result of the process. The processing routine is finished.

In step S1006, a list of the network devices arranged on the device map using the variable m as an index is obtained. It is now assumed that the construction information (device map construction information) of each device map has individually been stored in the file which can be identified by the ID of the device map shown in FIG. 12. FIGS. 13 and 14 show examples of the device map construction information.

FIG. 13 shows construction information of the device maps shown in FIGS. 5 and 7. In the diagram, reference numeral shown at the left edge of each line indicates a line number added for the purpose of simply explaining. In the diagram, a size of device map has been stored on line 1 and a name of an image file which is displayed as a background of the device map has been stored on line 2. The image file which is displayed as a background of the device map is an image showing an outline of the installing locations. For example, in the device map of FIG. 5, an image showing desks, chairs, and passages is expressed in the image file. By arranging the icons showing the network devices onto the outline of the installing locations shown by the image file, in which locations in a room or a building the network devices have been installed can be easily confirmed.

Information regarding the various icons arranged on the device map has been stored in line 3 and subsequent lines. Information of a map icon to jump to another device map has been described in lines 3-4. Information of a Web icon to jump to another Web site has been described in lines 5-6 and lines 7-8.

Information of device icons to jump to the device management page has been described in lines 9-12 and lines 13-16. Information regarding the devices associated to the device icons has been stored in the information of the device icons stored in lines 9-12 and lines 13-16. By comparing the information stored here with the information for identifying the network devices stored in step S901, whether the icons indicative of the network devices as processing targets have been arranged on the device map or not can be discriminated. By counting the number of stored information of the device icons, the number of network devices arranged on the device map can be obtained.

Further, coordinate data (XPOSITION, YPOSITION) showing the arranging position, a title (DEVICE TYPE, NAME, MODEL) which is displayed in a form such that it is annexed to the icon, and the like are also included in each of the information regarding the icons.

Similarly, FIG. 14 shows construction information of the device map shown in FIG. 6. A size of device map has been stored in line 1. A name of the image file which is displayed as a background of the device map has been stored in line 2.

Information regarding various icons arranged on the device map has been stored in line 3 and subsequent lines. Information of a map icon to jump to another device map has been described in lines 3-4.

Information of a Web icon to jump to another Web site has been described in lines 5-6 and lines 7-8.

Information of the device icons to jump to the device management page has been described in lines 9-12 and lines 13-16.

An explanation of FIG. 10 will be continued. In step S1007, a value of a variable n to count the number of devices arranged on the device map using the variable m as an index is initialized to 0. The value of the variable n becomes the index value starting from 0 for referring to each of the network devices arranged on the device map using the variable m as an index in processes, which will be explained hereinlater.

In step S1008, the value of the variable n is compared with the number of network devices arranged on the device map. When the value of the variable n is smaller than the number of network devices, step S1010 follows (YES in step S1008). Otherwise, step S1009 follows (NO in step S1008).

In step S1009, "1" is added to the value of the variable m and step S1004 follows.

In step S1010, the information of the network device using the variable n as an index is compared with the ID information of the device stored in step S1001. If the nth network device coincides with the designated network device, step S1011 follows (YES in step S1010). Otherwise, step S1012 follows (NO in step S1010).

In step S1011, a search result showing that the device map on which the designated network device has been arranged exists and the information (for example, ID of the device map) to identify the device map are returned as a processing result. The processing routine is finished.

In step S1012, "1" is added to the value of the variable n and step S1008 follows.

By the above processes, if the icon showing the network device has been arranged on one of the device maps, the device map on the arranging destination side is specified and the information to identify the device map on the arranging destination side, for example, the device map ID can be provided.

Figure 11:
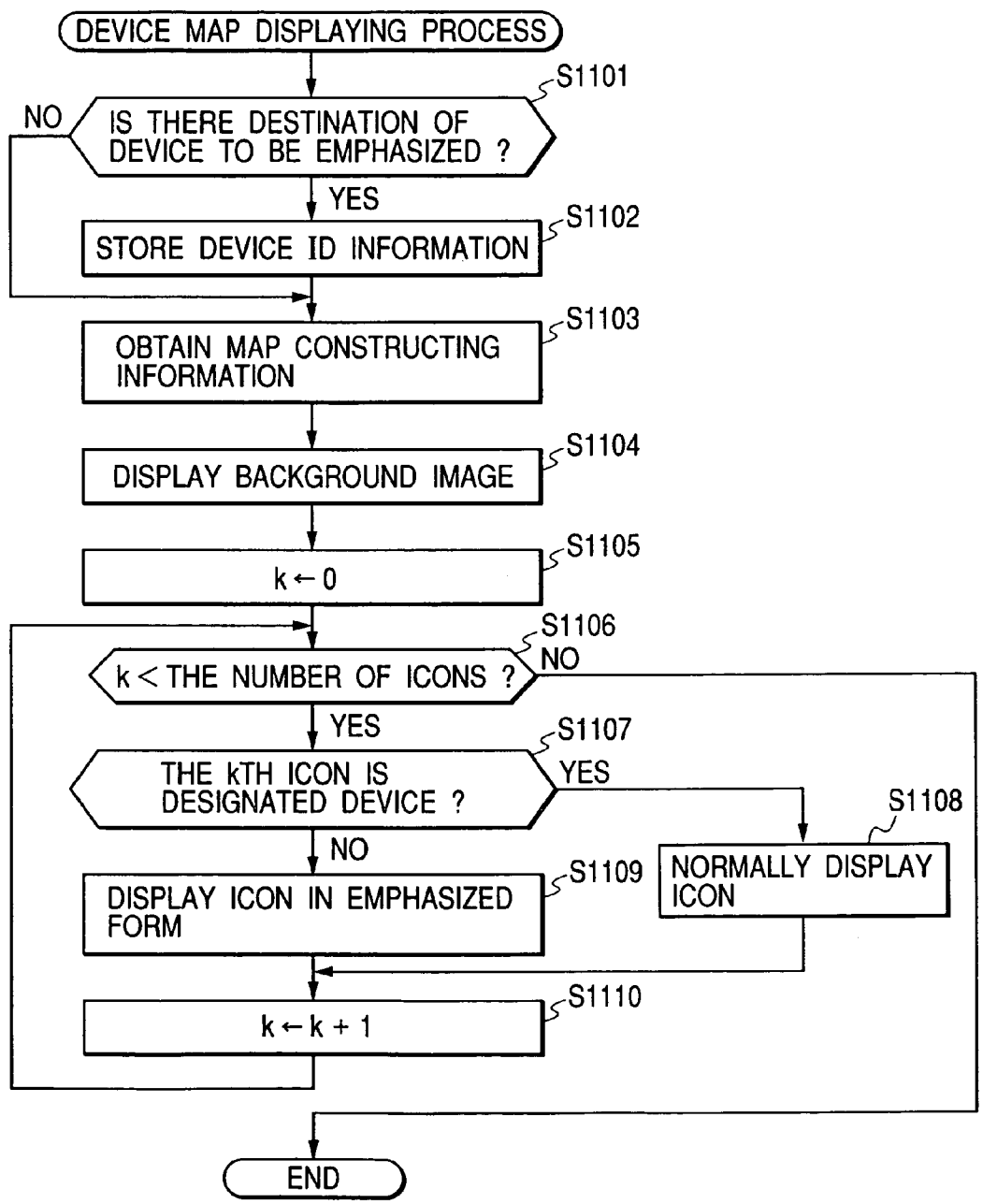
FIG. 11 is a flowchart showing an example of a process in the case of displaying the device map.

FIG. 11 is a flowchart showing an example of a process in the case of displaying the device map shown in FIGS. 5, 6, and 7. The icon showing the specific network device is also emphasis-displayed.

The processing routine shown in FIG. 11 is activated when there is a display request of the device map. When the display request is made, the information (for example, ID of the device map) to identify the device map to be displayed and, if the network device which needs to be emphasis-displayed exists, the information (for example, the MAC address) to identify such a network device are designated.

For example, if the link to the device map is clicked and the device map is displayed, the network device to be emphasis-displayed is designated. In other methods (for example, in the case where in the device list 300 in FIG. 3, "map format" is selected from the dropdown list box 306 and the device map is displayed), the network device to be emphasis-displayed is not particularly designated.

In FIG. 11, in step S1101, whether the network device which needs to be emphasis-displayed has been designated at the time of the display request of the device map or not is discriminated. If the network device has been designated, step S1102 follows (YES in step S1101). Otherwise, step S1103 follows (NO in step S1101). In step S1102, the ID information of the network device which needs to be emphasis-displayed and has been designated at the time of the display request of the device map is stored.

In step S1103, the construction information (for example, data shown in FIGS. 13 and 14) of the device map to be displayed is obtained. In step S1104, an image of the background of the device map is displayed on the basis of the image file designated by the construction information of the device map.

Further, the icons are displayed in step S1105 and subsequent steps. First, in step S1105, a value of a variable k to count the number of icons arranged on the device map is initialized to 0. The value of the variable k becomes an index value which starts from 0 and is used to refer to the information of each of the icons arranged on the device map to be displayed in the following processes.

In step S1106, the value of the variable k is compared with the number of icons arranged on the device map. If the value of the variable k is smaller than the number of icons, step S1107 follows (YES in step S1106). Otherwise, the processing routine is finished (NO in step S1106).

In step S1107, information of the kth icon is checked, thereby discriminating whether this icon is the device icon and the network device associated to the device icon is the network device shown by the ID information stored in step S1102 or not. If YES, step S1109 follows (YES in step S1107). Otherwise, step S1108 follows (NO in step S1107).

In step S1108, the kth icon is displayed in a normal format onto the device map. In step S1109, the kth icon is emphasis-displayed in a format such that it can be distinguished from other icons. In step S1110, "1" is added to the value of the variable k. In the case of displaying, a displaying position is determined on the basis of coordinate data included in the information of the icon and the icon is displayed in the position shown by the coordinate data.

FIG. 11 shows a displaying process of the network device management software in the case where the network device management software is activated in each PC.

However, in the case where the network device management software and the Web server are activated in the server PC and the Web browser activated in each client PC accesses the network device management software on the server PC, "display" in FIG. 11 denotes a process such that the network device management software on the server PC embeds the information to be displayed on the Web page which is provided to the Web browser via the Web server. That is, if the Web page has been described by a language such as HTML, XML, or the like, the information regarding the network device and the link to the device map are described in the Web page. Further, in step S1109, a message showing that the icon is emphasis-displayed is described in the Web page. The network device management software transmits data of the formed Web page to the Web browser via the Web server.

By this method, when the image showing the outline of the installing locations is displayed on the device map, the icons showing the network devices can be displayed. Particularly, if the link 305 in FIG. 3 or the link 405 in FIG. 4 has been designated, the icons of the specific network devices can be emphasis-displayed. In which position in the device map the icon indicative of the network device designated by the user has been arranged can be displayed so that the user can easily confirm it.

By a program which is installed from the outside, the network device management software according to the invention described above can be executed on the PC 200 on which the network device management software shown in FIG. 2 can operate. In this case, the invention is applied to the case where the program is supplied to the PC 200 by a memory medium such as flash memory, floppy disk, CD-ROM, DVD-ROM, or the like or by loading an information group including the program from an external memory medium onto the PC 200 via a network such as E-mail, personal computer communication, or the like.

FIG. 15 is a diagram showing a memory map in a CD-ROM as an example of the memory medium. Reference numeral 9999 denotes an area in which directory information has been stored. An area 9998 in which subsequent installing program has been stored and an area 9997 in which the network device management software has been stored are shown. Reference numeral 9998 denotes the area in which the installing program has been stored and 9997 indicates the area in which the network device management software has been stored. When the network device management software according to the invention is installed into the PC 200, the installing program stored in the area 9998 is read out therefrom and loaded into the system and executed by the CPU 201. Subsequently, the installing program which is executed by the CPU 201 reads out the network device management software from the area 9997 in which the network device management software has been stored and stores it onto the hard disk 211.

Naturally, the object of the invention is also accomplished by a method whereby a memory medium in which program codes of software to realize the functions of the embodiments mentioned above have been recorded is supplied to a system or an apparatus and a computer (or a CPU or an MPU) of the system or the apparatus reads out and executes the program codes stored in the memory medium. In this case, the program codes themselves read out from the memory medium realize the novel functions of the invention and the memory medium in which the program codes have been stored constructs the invention.

As a memory medium for supplying the program codes, for example, a floppy disk, a hard disk, an optical disk, a magnetooptic disk, a CD-ROM, a CD-R, a DVD-ROM, a magnetic tape, a non-volatile memory card, a ROM, or the like can be used.

The functions of the embodiments mentioned above can be realized by a method whereby a computer executes the read-out program codes. As another method, an OS or the like which is operating on a computer executes a part or all of actual processes and the functions of the embodiments mentioned above can be realized by those processes.

Further, the program codes read out from the memory medium are written into a memory provided for a function expanding board inserted into a computer or a function expanding unit connected to a computer, a CPU or the like provided for the function expanding board or the function expanding unit executes a part or all of actual processes on the basis of instructions of the program codes, and the functions of the embodiments mentioned above can be realized by those processes.

Naturally, the invention can be applied to a case where a program is distributed to a requester via a communication line such as personal computer communication or the like from a memory medium in which program codes of software for realizing the functions of the embodiments mentioned above have been recorded.

As described above, according to the invention, in which position of which display screen the ID information indicative of the designated network device has been arranged is displayed so that the user can easily and quickly confirm it.

Further, with respect to each of the network devices detected by the search, the link to the display screen expressing the map showing the installing locations of the network devices is displayed in correspondence to the list of the network devices or the management page of the network devices, thereby enabling the display screen on which the icons indicative of the network devices have been arranged to be easily displayed, so that there is an effect of the improvement in the use efficiency of the user.

Moreover, when the display screen is displayed, by emphasis-displaying the icon indicative of the designated network device, the installing location of the network device in a place expressed by the display screen can be displayed so that it can be identified, so that there is an effect of the improvement in the use efficiency of the user.

The invention claimed is:

1. A network management apparatus for displaying information regarding network devices connected to a network, the apparatus comprising:
information obtaining means for obtaining the information regarding the network devices;
list display control means for controlling display of a list screen showing a list of the information regarding the network devices obtained by the information obtaining means;
location display control means for controlling display of a device installation map expressing installation locations of the network devices in a room of a floor together with symbols indicative of the network devices; and
discrimination means for discriminating whether an icon corresponding to a certain one of the network devices is included in the device installation map,
wherein the list display control means controls the display of the list screen such that, if the discrimination means discriminates that the icon corresponding to the certain network device is included in the device installation map, a link to the device installation map is displayed in correspondence with the information regarding the network devices shown on the list screen, and such that, if the discrimination means discriminates that the icon corresponding to the device map for the certain network device is not included in the device installation map, the link is not displayed on the list screen.

2. An apparatus according to claim 1, wherein the list display control means controls the display of the list screen such that, if the link is selected, the location display control means controls the display such that a device installation map on which the symbol indicative of the certain network device is arranged is searched and a device map corresponding to the device installation map is displayed.

3. An apparatus according to claim 1, further comprising searching means for searching the network devices connected to the network, wherein the information obtaining means obtains the information regarding the network devices from the network devices found by the searching means.

4. A display method of displaying information regarding network devices connected to a network, comprising:
an information obtaining step of obtaining the information regarding the network devices;
a list display control step of controlling display of a list screen showing a list of the information regarding the network devices obtained in the information obtaining step;
a location display control step of controlling display of a device installation map expressing installation locations of the network devices in a room of a floor together with symbols indicative of the network devices; and
a discrimination step of discriminating whether an icon corresponding to a certain one of the network devices is included in the device installation map,
wherein the list display control step includes controlling the display of the list screen such that, if in the discrimination step it is discriminated that the icon corresponding to the certain network device is included in the device installation map, a link to the device installation map is displayed in correspondence with the information regarding the network devices shown on the list screen, and such that, if in the discrimination step it is discriminated that the device map for the icon corresponding to the certain network device is not included in the device installation map, the link is not displayed on the list screen.

5. A method according to claim 4, wherein, when the link is selected, the location display control step includes controlling the display such that a device installation map on which the symbol indicative of the certain network device is arranged is searched and a device map corresponding to the device installation map is displayed.

6. A method according to claim 4, further comprising a searching step of searching the network devices connected to the network,
wherein the information obtaining step includes obtaining the information regarding the network devices from the network devices found in the searching step.

7. A computer-readable medium, having a computer program recorded thereon for causing a computer to perform a method of displaying information regarding network devices connected to a network, wherein the method comprises:
an information obtaining step of obtaining the information regarding the network devices;
a list display control step of controlling display of a list screen showing a list of the information regarding the network devices obtained in the information obtaining step;

a location display control step of controlling display of the network devices onto a device installation map expressing installation locations of the network devices in a room of a floor together with symbols indicative of the network devices; and a discrimination step of discriminating whether an icon corresponding to a certain one of the network devices is included in the device installation map, and the list display control step includes controlling the display of the list screen such that, if in the discrimination step it is discriminated that the icon corresponding to the certain network device is included in the device installation map, a link to the device installation map is displayed in correspondence with the information regarding the network devices shown on the list screen, and such that, if in the discrimination step it is discriminated that the icon corresponding to the device map for the certain network device is not included in the device installation map, the link is not displayed on the list screen.

8. A computer-readable medium according to claim 7, wherein, in the location display control step, when the link is selected, the location display control step includes controlling the display such that a device installation map on which the symbol indicative of the certain network devices is arranged is searched and a device map corresponding to the device installation map is displayed.

9. A computer-readable medium according to claim 7, wherein the method includes a searching step of searching the network devices connected to the network, wherein the information obtaining step includes obtaining the information regarding the network devices from the network devices found in the searching step.

* * * * *